United States Patent
Mukundan et al.

(10) Patent No.: US 11,212,140 B2
(45) Date of Patent: *Dec. 28, 2021

(54) NETWORK-LINK METHOD USEFUL FOR A LAST-MILE CONNECTIVITY IN AN EDGE-GATEWAY MULTIPATH SYSTEM

(71) Applicant: Nicira, Inc., Palo Alto, CA (US)

(72) Inventors: Sunil Mukundan, Chennai (IN); Stephen Craig Connors, San Jose, CA (US); Steven Michael Woo, Los Altos, CA (US); Ajit Ramachandra Mayya, Saratoga, CA (US); Thomas Harold Speeter, San Martin, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,700

(22) Filed: Jul. 31, 2020

(65) Prior Publication Data
US 2020/0366530 A1    Nov. 19, 2020

Related U.S. Application Data

(63) Continuation of application No. 15/221,608, filed on Jul. 28, 2016, now Pat. No. 10,749,711, which is a (Continued)

(51) Int. Cl.
*H04L 12/66* (2006.01)
*H04L 29/08* (2006.01)
(Continued)

(52) U.S. Cl.
CPC ............ *H04L 12/66* (2013.01); *H04L 1/00* (2013.01); *H04L 1/004* (2013.01); *H04L 1/18* (2013.01);
(Continued)

(58) Field of Classification Search
CPC ....... H04L 12/66; H04L 47/41; H04L 47/125; H04L 47/2408; H04L 1/004
See application file for complete search history.

(56) References Cited

U.S. PATENT DOCUMENTS 5,652,751 A    7/1997  Sharony
5,909,553 A    6/1999  Campbell et al.
(Continued)

FOREIGN PATENT DOCUMENTS

EP    1912381 A1    4/2008
EP    3041178 A1    7/2016
(Continued)

OTHER PUBLICATIONS

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.
(Continued)

*Primary Examiner* — Mohammad S Anwar
(74) *Attorney, Agent, or Firm* — Adeli LLP

(57) ABSTRACT

In one exemplary aspect, an edge-gateway multipath method includes the step of providing an edge device in a local network communicatively coupled with a cloud-computing service in a cloud-computing network. A set of wide area network (WAN) links connected to the edge device are automatically detected. The WAN links are automatically measured without the need for an external router. The edge device is communicatively coupled with a central configuration point in the cloud-computing network. The method further includes the step of downloading, from the central configuration point, an enterprise-specific configuration data into the edge device. The enterprise-specific configuration data includes the gateway information. The edge device is communicatively coupled with a gateway in the cloud-
(Continued)

computing network. The communicatively coupling of the edge device with the gateway includes a multipath (MP) protocol.

20 Claims, 7 Drawing Sheets

Related U.S. Application Data continuation-in-part of application No. 14/321,818, filed on Jul. 2, 2014, now Pat. No. 9,722,815.

(60) Provisional application No. 61/844,822, filed on Jul. 10, 2013.

(51) Int. Cl.
| | | |
|---|---|---|
| *H04L 12/707* | (2013.01) | |
| *H04L 12/891* | (2013.01) | |
| *H04L 12/803* | (2013.01) | |
| *H04L 12/851* | (2013.01) | |
| *H04L 1/00* | (2006.01) | |
| *H04L 1/18* | (2006.01) | |
| *H04L 12/26* | (2006.01) | |
| *H04L 1/16* | (2006.01) | |

(52) U.S. Cl.
CPC ............ *H04L 43/028* (2013.01); *H04L 45/24* (2013.01); *H04L 47/125* (2013.01); *H04L 47/2408* (2013.01); *H04L 47/41* (2013.01); *H04L 67/02* (2013.01); *H04L 1/1671* (2013.01); *H04L 43/0894* (2013.01)

(56) References Cited

U.S. PATENT DOCUMENTS

| | | | |
|---|---|---|---|
| 6,154,465 | A | 11/2000 | Pickett |
| 6,157,648 | A | 12/2000 | Voit et al. |
| 6,201,810 | B1 | 3/2001 | Masuda et al. |
| 6,363,378 | B1 | 3/2002 | Conklin et al. |
| 6,445,682 | B1 | 9/2002 | Weitz |
| 6,744,775 | B1 | 6/2004 | Beshai et al. |
| 6,976,087 | B1 | 12/2005 | Westfall et al. |
| 7,003,481 | B2 | 2/2006 | Banka et al. |
| 7,280,476 | B2 | 10/2007 | Anderson |
| 7,313,629 | B1 | 12/2007 | Nucci et al. |
| 7,320,017 | B1 | 1/2008 | Kurapati et al. |
| 7,581,022 | B1 | 8/2009 | Griffin et al. |
| 7,680,925 | B2 | 3/2010 | Sathyanarayana et al. |
| 7,681,236 | B2 | 3/2010 | Tamura et al. |
| 7,962,458 | B2 | 6/2011 | Holenstein et al. |
| 8,094,575 | B1 | 1/2012 | Vadlakonda et al. |
| 8,094,659 | B1 | 1/2012 | Arad |
| 8,111,692 | B2 | 2/2012 | Ray |
| 8,141,156 | B1 | 3/2012 | Mao et al. |
| 8,224,971 | B1 | 7/2012 | Miller et al. |
| 8,228,928 | B2 | 7/2012 | Parandekar et al. |
| 8,243,589 | B1 | 8/2012 | Trost et al. |
| 8,259,566 | B2 | 9/2012 | Chen et al. |
| 8,274,891 | B2 | 9/2012 | Averi et al. |
| 8,301,749 | B1 | 10/2012 | Finklestein et al. |
| 8,385,227 | B1 | 2/2013 | Downey |
| 8,566,452 | B1 | 10/2013 | Goodwin et al. |
| 8,630,291 | B2 | 1/2014 | Shaffer et al. |
| 8,661,295 | B1 | 2/2014 | Khanna et al. |
| 8,724,456 | B1 | 5/2014 | Hong et al. |
| 8,724,503 | B2 | 5/2014 | Johnsson et al. |
| 8,745,177 | B1 | 6/2014 | Kazerani et al. |
| 8,799,504 | B2 | 8/2014 | Capone et al. |
| 8,804,745 | B1 | 8/2014 | Sinn |
| 8,806,482 | B1 | 8/2014 | Nagargadde et al. |
| 8,856,339 | B2 | 10/2014 | Mestery et al. |
| 8,964,548 | B1 | 2/2015 | Keralapura et al. |
| 8,989,199 | B1 | 3/2015 | Sella et al. |
| 9,009,217 | B1 | 4/2015 | Nagargadde et al. |
| 9,055,000 | B1 | 6/2015 | Ghosh et al. |
| 9,060,025 | B2 | 6/2015 | Xu |
| 9,071,607 | B2 | 6/2015 | Twitchell, Jr. |
| 9,075,771 | B1 | 7/2015 | Gawali et al. |
| 9,135,037 | B1 | 9/2015 | Petrescu-Prahova et al. |
| 9,137,334 | B2 | 9/2015 | Zhou |
| 9,154,327 | B1 | 10/2015 | Marino et al. |
| 9,306,949 | B1 | 4/2016 | Richard et al. |
| 9,323,561 | B2 | 4/2016 | Ayala et al. |
| 9,336,040 | B2 | 5/2016 | Dong et al. |
| 9,354,983 | B1 | 5/2016 | Yenamandra et al. |
| 9,356,943 | B1 | 5/2016 | Lopilato et al. |
| 9,379,981 | B1 | 6/2016 | Zhou et al. |
| 9,413,724 | B2 | 8/2016 | Xu |
| 9,419,878 | B2 | 8/2016 | Hsiao et al. |
| 9,432,245 | B1 | 8/2016 | Sorenson et al. |
| 9,438,566 | B2 | 9/2016 | Zhang et al. |
| 9,450,817 | B1 | 9/2016 | Bahadur et al. |
| 9,450,852 | B1 | 9/2016 | Chen et al. |
| 9,462,010 | B1 | 10/2016 | Stevenson |
| 9,467,478 | B1 | 10/2016 | Khan et al. |
| 9,485,163 | B1 | 11/2016 | Fries et al. |
| 9,521,067 | B2 | 12/2016 | Michael et al. |
| 9,525,564 | B2 | 12/2016 | Lee |
| 9,559,951 | B1 | 1/2017 | Sajassi et al. |
| 9,563,423 | B1 | 2/2017 | Pittman |
| 9,602,389 | B1 | 3/2017 | Maveli et al. |
| 9,608,917 | B1 | 3/2017 | Anderson et al. |
| 9,608,962 | B1 | 3/2017 | Chang |
| 9,621,460 | B2 | 4/2017 | Mehta et al. |
| 9,641,551 | B1 | 5/2017 | Kariyanahalli |
| 9,665,432 | B2 | 5/2017 | Kruse et al. |
| 9,686,127 | B2 | 6/2017 | Ramachandran et al. |
| 9,715,401 | B2 | 7/2017 | Devine et al. |
| 9,717,021 | B2 | 7/2017 | Hughes et al. |
| 9,722,815 | B2 | 8/2017 | Mukundan et al. |
| 9,747,249 | B2 | 8/2017 | Cherian et al. |
| 9,755,965 | B1 | 9/2017 | Yadav et al. |
| 9,787,559 | B1 | 10/2017 | Schroeder |
| 9,807,004 | B2 | 10/2017 | Koley et al. |
| 9,819,565 | B2 | 11/2017 | Djukic et al. |
| 9,825,822 | B1 | 11/2017 | Holland |
| 9,825,911 | B1 | 11/2017 | Brandwine |
| 9,825,992 | B2 | 11/2017 | Xu |
| 9,832,128 | B1 | 11/2017 | Ashner et al. |
| 9,832,205 | B2 | 11/2017 | Santhi et al. |
| 9,875,355 | B1 | 1/2018 | Williams |
| 9,906,401 | B1 | 2/2018 | Rao |
| 9,930,011 | B1 | 3/2018 | Clemons, Jr. et al. |
| 9,935,829 | B1 | 4/2018 | Miller et al. |
| 9,942,787 | B1 | 4/2018 | Tillotson |
| 10,038,601 | B1 | 7/2018 | Becker et al. |
| 10,057,183 | B2 | 8/2018 | Salle et al. |
| 10,057,294 | B2 | 8/2018 | Xu |
| 10,135,789 | B2 | 11/2018 | Mayya et al. |
| 10,142,226 | B1 | 11/2018 | Wu et al. |
| 10,178,032 | B1 | 1/2019 | Freitas |
| 10,187,289 | B1 | 1/2019 | Chen et al. |
| 10,229,017 | B1 | 3/2019 | Zou et al. |
| 10,237,123 | B2 | 3/2019 | Dubey et al. |
| 10,250,498 | B1 | 4/2019 | Bales et al. |
| 10,263,832 | B1 | 4/2019 | Ghosh |
| 10,320,664 | B2 | 6/2019 | Nainar et al. |
| 10,320,691 | B1 | 6/2019 | Matthews et al. |
| 10,326,830 | B1 | 6/2019 | Singh |
| 10,348,767 | B1 | 7/2019 | Lee et al. |
| 10,355,989 | B1 | 7/2019 | Panchal et al. |
| 10,425,382 | B2 | 9/2019 | Mayya et al. |
| 10,454,708 | B2 | 10/2019 | Mibu |
| 10,454,714 | B2 | 10/2019 | Mayya et al. |
| 10,498,652 | B2 | 12/2019 | Mayya et al. |
| 10,511,546 | B2 | 12/2019 | Singarayan et al. |
| 10,523,539 | B2 | 12/2019 | Mayya et al. |
| 10,554,538 | B2 | 2/2020 | Spohn et al. |
| 10,560,431 | B1 | 2/2020 | Chen et al. |
| 10,565,464 | B2 | 2/2020 | Han et al. |
| 10,567,519 | B1 | 2/2020 | Mukhopadhyaya et al. |

(56) References Cited

U.S. PATENT DOCUMENTS

| | | |
|---|---|---|
| 10,574,528 B2 | 2/2020 | Mayya et al. |
| 10,594,516 B2 | 3/2020 | Cidon et al. |
| 10,594,659 B2 | 3/2020 | El-Moussa et al. |
| 10,608,844 B2 | 3/2020 | Cidon et al. |
| 10,637,889 B2 | 4/2020 | Ermagan et al. |
| 10,666,460 B2 | 5/2020 | Cidon et al. |
| 10,686,625 B2 | 6/2020 | Cidon et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,805,114 B2 | 10/2020 | Cidon et al. |
| 10,805,272 B2 | 10/2020 | Mayya et al. |
| 10,826,775 B1 | 11/2020 | Moreno et al. |
| 10,841,131 B2 | 11/2020 | Cidon et al. |
| 10,938,693 B2 | 3/2021 | Mayya et al. |
| 10,958,479 B2 | 3/2021 | Cidon et al. |
| 10,959,098 B2 | 3/2021 | Cidon et al. |
| 2002/0087716 A1 | 7/2002 | Mustafa |
| 2002/0198840 A1 | 12/2002 | Banka et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0154790 A1 | 7/2005 | Nagata et al. |
| 2005/0172161 A1 | 8/2005 | Cruz et al. |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0091794 A1 | 4/2007 | Filsfils et al. |
| 2007/0115812 A1 | 5/2007 | Hughes |
| 2007/0121486 A1 | 5/2007 | Guichard et al. |
| 2007/0130325 A1* | 6/2007 | Lesser ............... H04L 43/0823 709/224 |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0080509 A1 | 4/2008 | Khanna et al. |
| 2008/0095187 A1 | 4/2008 | Jung et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Klessig et al. |
| 2009/0154463 A1 | 6/2009 | Hines et al. |
| 2009/0247204 A1 | 10/2009 | Sennett et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0191884 A1 | 7/2010 | Holenstein et al. |
| 2010/0223621 A1 | 9/2010 | Joshi et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1* | 6/2012 | Eichen ............... H04L 65/1053 455/417 |
| 2012/0173694 A1 | 7/2012 | Yan et al. |
| 2012/0173919 A1 | 7/2012 | Patel et al. |
| 2012/0221955 A1 | 8/2012 | Raleigh et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0300615 A1 | 11/2012 | Kempf et al. |
| 2012/0317291 A1 | 12/2012 | Wolfe |
| 2013/0019005 A1* | 1/2013 | Hui ............... H04L 41/0896 709/224 |
| 2013/0021968 A1 | 1/2013 | Reznik et al. |
| 2013/0044764 A1 | 2/2013 | Casado et al. |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0103834 A1 | 4/2013 | Dzerve et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1* | 5/2013 | Mathur ............... H04L 12/1877 370/390 |
| 2013/0142201 A1 | 6/2013 | Kim et al. |
| 2013/0173788 A1 | 7/2013 | Song |
| 2013/0182712 A1 | 7/2013 | Aguayo et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0283364 A1 | 10/2013 | Chang et al. |
| 2013/0286846 A1 | 10/2013 | Atlas et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1* | 12/2013 | Chesla ............... H04L 45/42 370/392 |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0208317 A1 | 7/2014 | Nakagawa |

(56) References Cited

U.S. PATENT DOCUMENTS

| | | |
|---|---|---|
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0312142 A1 | 10/2015 | Barabash et al. |
| 2015/0317169 A1 | 11/2015 | Sinha et al. |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0363733 A1 | 12/2015 | Brown |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0218947 A1 | 7/2016 | Hughes et al. |
| 2016/0218951 A1 | 7/2016 | Vasseur et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034129 A1 | 2/2017 | Sawant et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0093625 A1 | 3/2017 | Pera et al. |
| 2017/0097841 A1 | 4/2017 | Chang et al. |
| 2017/0104755 A1 | 4/2017 | Arregoces et al. |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0280474 A1 | 9/2017 | Vesterinen et al. |
| 2017/0289002 A1 | 10/2017 | Ganguli et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0374174 A1 | 12/2017 | Evens et al. |
| 2018/0006995 A1 | 1/2018 | Bickhart et al. |
| 2018/0007123 A1 | 1/2018 | Cheng et al. |
| 2018/0014051 A1 | 1/2018 | Phillips et al. |

(56) References Cited

U.S. PATENT DOCUMENTS

| | | |
|---|---|---|
| 2018/0034668 A1 | 2/2018 | Mayya et al. |
| 2018/0041425 A1 | 2/2018 | Zhang |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028552 A1 | 1/2019 | Johnson et al. |
| 2019/0036810 A1 | 1/2019 | Michael et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0140889 A1 | 5/2019 | Mayya et al. |
| 2019/0140890 A1 | 5/2019 | Mayya et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0268421 A1 | 8/2019 | Markuze et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0313907 A1 | 10/2019 | Khachaturian et al. |
| 2019/0319847 A1 | 10/2019 | Nahar et al. |
| 2019/0356736 A1 | 11/2019 | Narayanaswamy et al. |
| 2019/0364099 A1 | 11/2019 | Thakkar et al. |
| 2019/0372888 A1 | 12/2019 | Michael et al. |
| 2019/0372889 A1 | 12/2019 | Michael et al. |
| 2019/0372890 A1 | 12/2019 | Michael et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0059420 A1 | 2/2020 | Abraham |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0153736 A1 | 5/2020 | Liebherr et al. |
| 2020/0177503 A1 | 6/2020 | Hooda et al. |
| 2020/0204460 A1 | 6/2020 | Schneider et al. |
| 2020/0213212 A1 | 7/2020 | Dillon et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0267184 A1 | 8/2020 | Vera-Schockner |
| 2020/0280587 A1 | 9/2020 | Janakiraman et al. |
| 2020/0296011 A1 | 9/2020 | Jain et al. |
| 2020/0296026 A1 | 9/2020 | Michael et al. |
| 2020/0314614 A1 | 10/2020 | Moustafa et al. |
| 2020/0351188 A1 | 11/2020 | Arora et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2021/0006490 A1 | 1/2021 | Michael et al. |
| 2021/0029088 A1 | 1/2021 | Mayya et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |

FOREIGN PATENT DOCUMENTS

| | | |
|---|---|---|
| EP | 3509256 A1 | 7/2019 |
| WO | 03073701 | 9/2003 |
| WO | 2012167184 A2 | 12/2012 |
| WO | 2017083975 A1 | 5/2017 |
| WO | 2019070611 A1 | 4/2019 |
| WO | 2019094522 A1 | 5/2019 |
| WO | 2020018704 A1 | 1/2020 |
| WO | 2020101922 A1 | 5/2020 |
| WO | 2021040934 A1 | 3/2021 |

OTHER PUBLICATIONS

Non-Published Commonly Owned U.S. Appl. No. 16/662,363, filed Oct. 24, 2019, 129 pages, VMware, Inc.
Non-Published Commonly Owned U.S. Appl. No. 16/662,379, filed Oct. 24, 2019, 123 pages, VMware, Inc.

(56) References Cited

OTHER PUBLICATIONS

Non-Published Commonly Owned U.S. Appl. No. 16/662,402, filed Oct. 24, 2019, 128 pages, VMware, Inc.
Non-Published Commonly Owned U.S. Appl. No. 16/662,427, filed Oct. 24, 2019, 165 pages, VMware, Inc.
Non-Published Commonly Owned U.S. Appl. No. 16/662,489, filed Oct. 24, 2019, 165 pages, VMware, Inc.
Non-Published Commonly Owned U.S. Appl. No. 16/662,510, filed Oct. 24, 2019, 165 pages, VMware, Inc.
Non-Published Commonly Owned U.S. Appl. No. 16/662,531, filed Oct. 24, 2019, 135 pages, VMware, Inc.
Non-Published Commonly Owned U.S. Appl. No. 16/662,570, filed Oct. 24, 2019, 141 pages, VMware, Inc.
Non-Published Commonly Owned U.S. Appl. No. 16/662,587, filed Oct. 24, 2019, 145 pages, VMware, Inc.
Non-Published Commonly Owned U.S. Appl. No. 16/662,591, filed Oct. 24, 2019, 130 pages, VMware, Inc.
Non-Published Commonly Owned U.S. Appl. No. 16/721,964, filed Dec. 20, 2019, 39 pages, VMware, Inc.
Non-Published Commonly Owned U.S. Appl. No. 16/721,965, filed Dec. 20, 2019, 39 pages, VMware, Inc.
Non-Published Commonly Owned U.S. Appl. No. 16/792,908, filed Feb. 18, 2020, 48 pages, VMware, Inc.
Non-Published Commonly Owned U.S. Appl. No. 16/792,909, filed Feb. 18, 2020, 49 pages, VMware, Inc.
Non-Published Commonly Owned U.S. Appl. No. 16/851,294, filed Apr. 17, 2020, 59 pages, VMware, Inc.
Non-Published Commonly Owned U.S. Appl. No. 16/851,301, filed Apr. 17, 2020, 59 pages, VMware, Inc.
Non-Published Commonly Owned U.S. Appl. No. 16/851,308, filed Apr. 17, 2020, 59 pages, VMware, Inc.
Non-Published Commonly Owned U.S. Appl. No. 16/851,314, filed Apr. 17, 2020, 59 pages, VMware, Inc.
Non-Published Commonly Owned U.S. Appl. No. 16/851,323, filed Apr. 17, 2020, 59 pages, VMware, Inc.
Non-Published Commonly Owned U.S. Appl. No. 16/851,397, filed Apr. 17, 2020, 59 pages, VMware, Inc.
Petition for Post-Grant Review of U.S. Pat. No. 9,722,815, filed May 1, 2018, 106 pages.
Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.
Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.
Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.
Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.
Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.
Non-Published Commonly Owned U.S. Appl. No. 17/068,603, filed Oct. 12, 2020, 37 pages, Nicira, Inc.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.
Lin, Weidong, et al., "Using Path Label Routing in Wide Area Software-Defined Networks with Open Flow," 2016 International Conference on Networking and Network Application, Jul. 2016, 6 pages, IEEE.

* cited by examiner

NETWORK-LINK METHOD USEFUL FOR A LAST-MILE CONNECTIVITY IN AN EDGE-GATEWAY MULTIPATH SYSTEM

CLAIM OF BENEFIT TO PRIOR APPLICATIONS

This application is a continuation application of U.S. patent application Ser. No. 15/221,608, filed Jul. 28, 2016, now published as U.S. Patent Publication 2017/0134186. U.S. patent application Ser. No. 15/221,608 is a continuation-in-part of U.S. patent application Ser. No. 14/321,818, filed on Jul. 2, 2014, now issued as U.S. Pat. No. 9,722,815. U.S. patent application Ser. No. 14/321,818 claims priority to U.S. Provisional Patent Application 61/844,822, filed on Jul. 10, 2013. U.S. patent application Ser. No. 15/221,608, now published as U.S. Patent Publication 2017/0134186, U.S. patent application Ser. No. 14/321,818, now issued as U.S. Pat. No. 9,722,815, and U.S. Provisional Patent Application 61/844,822 are hereby incorporated by reference in their entirety.

BACKGROUND

Several trends are altering the use of enterprise applications. For example, enterprises are moving to hosting applications in private and public clouds as opposed to enterprise data centers. Enterprises are also increasingly using applications provided by other companies, which are generically grouped under SaaS (Software-as-a-Service) and are not hosted in an enterprise-data center. In another example, enterprises are migrating from large Information Technology (IT) supported branches to smaller branches. These smaller branches can utilize remote IT management strategies.

These trends have combined to alter application's network paths and/or the quality of service (QoS) of these paths. With enterprise data-center applications, the large IT branches can lease multiprotocol label switching (MPLS) lines. MPLS can be mechanism in communications networks that directs data from one network node to the next node based on short path labels rather than long network addresses, thus avoiding complex lookups in a routing table. MPLS lines can be associated with a known level of QoS that provides a deterministic application access experience and/or application availability. Applications are moving to the cloud where they are deployed either in the public and/or hybrid cloud. Enterprise branches access these applications via the public Internet. Access to these applications in such cases may be hampered by the 'best effort' nature of access as opposed to having a known QoS level. Additionally, a smaller branch may also utilize computing devices that are relatively easy to deploy and/or remotely manage in the event no on-site IT staff is available.

BRIEF SUMMARY OF THE INVENTION

In one aspect, a network-link method useful for a last-mile connectivity in an edge-gateway multipath includes the step of identifying a network-traffic flow of a computer network using deep-packet inspection to determine an identity of an application type associated with the network-traffic flow. The network-link method includes the step of aggregating a bandwidth from a specified set of network links. The network-link method includes the step of intelligently load-balancing a traffic on the set of network links by sending successive packets belonging to a same traffic flow on a set of specified multiple-network links. The set of specified multiple-network links is selected based on the identity of an application type associated with the network-traffic flow. The network-link method includes the step of identifying a set of active-network links in the set of specified multiple-network links. The network-link method includes the step of providing an in-order data delivery with an application persistence by sending data packets belonging to a same data-packet flow on the set of active links. The network-link method includes the step of correcting an error on a lossy network link using an error-control mechanism for data transmission selectively based on the identified network-traffic flow nd a current measured condition in the computer network.

BRIEF DESCRIPTION OF THE DRAWINGS

The present application can be best understood by reference to the following description taken in conjunction with the accompanying figures, in which like parts may be referred to by like numerals.

Figure 1:
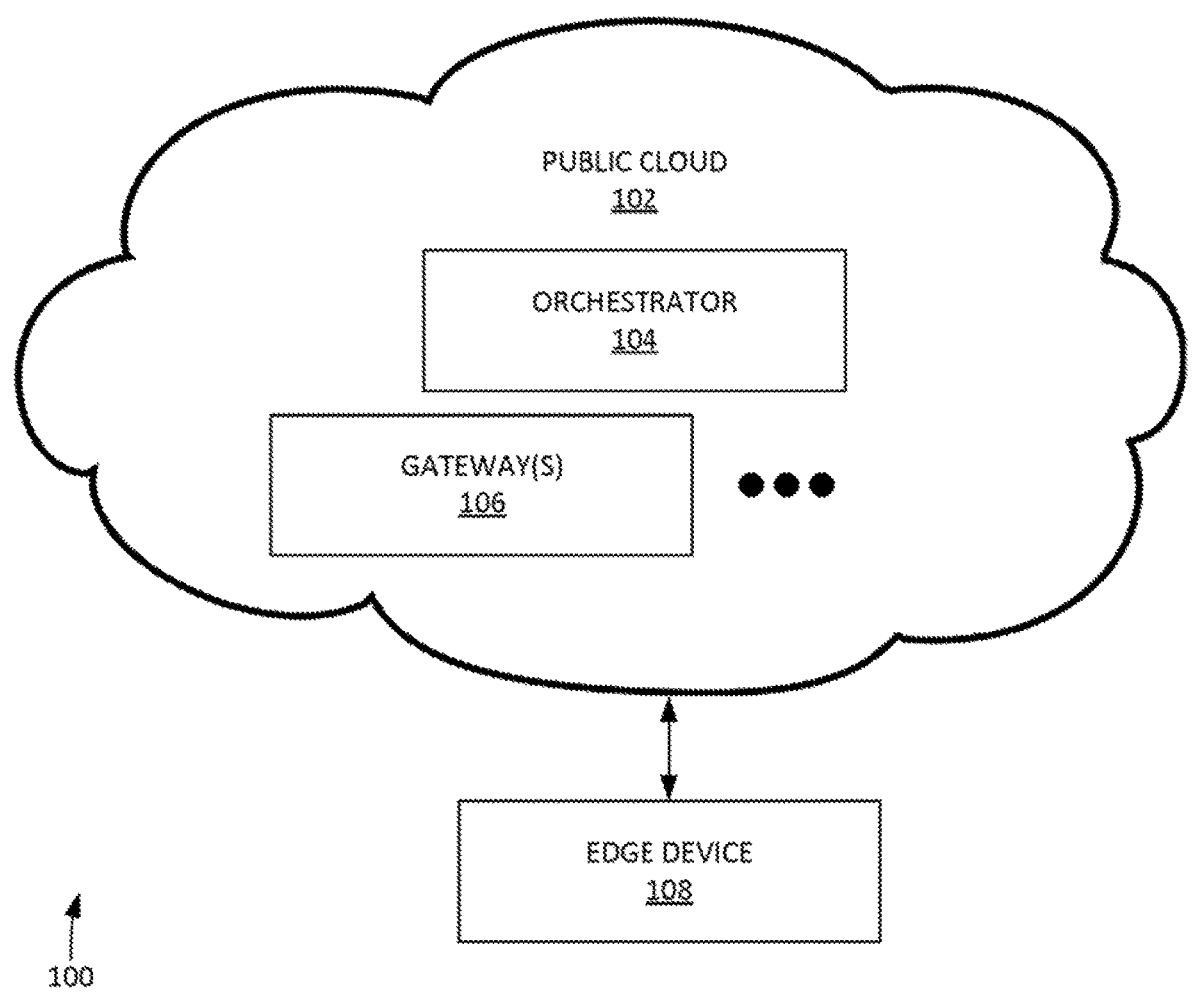
FIG. 1 illustrates an example a programmable, multi-tenant overlay network, according to some embodiments.

The Figures described above are a representative set, and are not an exhaustive with respect to embodying the invention.

DETAILED DESCRIPTION

Disclosed are a network-link method and system useful for a last-mile connectivity in an edge-gateway multipath. Although the present embodiments have been described with reference to specific example embodiments, it can be evident that various modifications and changes may be made to these embodiments without departing from the broader spirit and scope of the particular example embodiment.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, attendee selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labelled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definitions

Automatic Repeat reQuest (ARQ) can be an error-control method for data transmission that uses acknowledgements (e.g. messages sent by the receiver indicating that it has correctly received a data frame or packet) and timeouts (e.g. specified periods of time allowed to elapse before an acknowledgment is to be received) to achieve reliable data transmission over an unreliable service. If the sender does not receive an acknowledgment before the timeout, it retransmits the frame/packet until the sender receives an acknowledgment or exceeds a predefined number of retransmissions Deep-packet inspection (DPI) can include a form of computer network packet filtering that examines the data part (and also the header in some embodiments) of a packet as it passes an inspection point.

Forward error correction (FEC) can be used for controlling errors in data transmission over unreliable or noisy communication channels. A sender can encode a message in a redundant way by using an error-correcting code (ECC). FEC codes can include block codes, convolutional codes, etc.

Last-mile connectivity can refer to the final leg of the telecommunications networks delivery components and mechanisms.

Lossy can refer to data compression in which unnecessary information is discarded.

Multiprotocol Label Switching (MPLS) can be a type of data-carrying technique for high-performance telecommunications networks that directs data from one network node to the next based on short path labels rather than long network addresses, avoiding complex lookups in a routing table. The labels can identify virtual links between distant nodes rather than endpoints. MPLS can encapsulate packets of various network protocols. MPLS can support a range of access technologies, including, inter alia: T-carrier (e.g. T1)/E-carrier (E1), Asynchronous Transfer Mode (ATM), Frame Relay, and Digital subscriber line (DSL).

Quality of service (QoS) can refer to the overall performance of a telephony or computer network, particularly the performance seen by the users of the network.

Software as a Service (SaaS) can be a software licensing and delivery model in which software is licensed on a subscription basis and is centrally hosted.

Virtual Machine (VM) can be an emulationa particular computer system.

Link Characterization can refer to measuring the quality of a link which will include the latency (e.g. one-way packet delay), jitter (e.g. packet delay variation), loss (e.g. what percentage of packets are actually delivered at the receiving end) and available bandwidth.

Measured Condition in a computer network can refer to the characterization of one or more links that are connected to an edge device.

Error Control Mechanism can refer to the remedial action taken by an edge device or a gateway device to overcome the side effects of a non-perfect link. These mechanisms can be used to overcome jitter and loss experienced in any one link and include forward error correction (FEC), duplication of packets (e.g. if multiple links are available). This can also include an implementation of a jitter buffer which can minimize the effects of the packet delay variation.

Example Methods and Systems

FIG. 1 illustrates an example of a programmable, multi-tenant overlay network 100, according to some embodiments. An overlay network can be a computer network built on the top of another network. Overlay network 100 can include a distributed system such as a cloud-computing network (e.g. public cloud 102). Public cloud 102 can include a cloud-computing network. In some embodiments, public cloud 102 can be implemented, in whole or in part, as private cloud-computing network (e.g. a proprietary network or datacenter that uses cloud computing technologies). In other embodiments, the public cloud 102 can include SaaS companies 109 which provide applications to enterprises and end-consumers. As used herein, a cloud-computing network can include a computer network(s) that utilizes a variety of different computing concepts that involve a large number of computers connected through a real-time communication network (e.g. the Internet). A public cloud can include a set of computers and computer network resources based on the standard cloud-computing model, in which a service provider makes resources, such as applications and storage, available to the general public over the Internet. Applications, storage, and other resources can be made available by a service provider.

Public cloud 102 can include orchestrator 104 (e.g. a Velocloud® orchestrator). Orchestrator 104 can enable configuration and monitoring of the network from any location with Internet access. Orchestrator 104 can be a central controller for configuring and monitoring a multi-tenant instance of the overlay network described by a unique 'network ID'. Each such instance can have a set of tenant(s) that have tenant specific policies for sharing resources, access control and configuration. A tenant can then have a 'tenant-id' which is used to identify tenants in the network. Multiple independent instances of networks can exist so as to enable self-operated overlay networks similar to the public network.

In this context, an orchestrator 104 can perform various functions such as configuration and monitoring. Orchestrator 104 can enable role based configuration and management. The following can be examples of roles. An 'end-user'

(e.g. maps to an access device like laptop or mobile device) that connects to an edge device 108 that can be enabled to configure and/or monitor resources and policies that are specific to a user. A 'tenant administrator' can be a tenant administrator. A tenant administrator can configure tenant-wide policy and by extension policies for all the users in the tenancy. An 'operator' that can operate the overlay network by provisioning gateway(s) 106, edge device(s) 108 and/or other resources for the network (e.g. may not be able to view or modify tenant policies) can be provided.

In addition to this, the orchestrator 104 can also enable 'authenticated partners' to modify the behavior of the network (e.g. application service providers who want to reserve extra bandwidth for some applications sessions etc.) via published application program interface (APIs).

Public cloud 102 can include gateway(s) 106. A gateway can be a network node equipped for interfacing with another network utilizing different communication protocols. Gateway(s) 106 can be deployed in a public cloud (e.g. as shown in FIG. 1), a private cloud, Internet service provider (ISP) peering points and/or application service peering points that serve as aggregation points for multiple edges. Gateway(s) 106 can be located at peering points in public cloud 102.

Edge device 108 can provide entry points into enterprise and/or service-provider core networks. Example edge devices can include routers, routing switches, integrated access devices (IADs), multiplexers, and a variety of metropolitan area network (MAN) and wide area network (WAN) access devices. Edge device 108 can be deployed inline in one of several modes. In one example, edge device 108 can be deployed as a customer premises equipment (CPE) device in a branch that is capable of serving as a router. In one example, edge device 108 can be deployed as a powered mobile device that can be attached to end-user devices (e.g. laptops, desktops, wearable computers, tablet computers and the like via universal serial bus (USB)). In some examples, edge device 108 can include device software that directly interacts with a host-device operating system. In one example, the edge device 108 may be a virtual machine. A virtual machine can be a software-based emulation of a computer. In some examples, edge device 108 and the gateway(s) 106 can straddle the 'bottleneck' section of a communication network (e.g. the 'last-mile'—a final leg of a communication networks delivering communications connectivity to a network host such as an enterprise computing system). In some embodiments, edge device 108 can be characterized as 'zero touch' (e.g. no configuration explicitly required at client side). Accordingly, edge device can automatically detect an available wide area network (WAN) and locate orchestrator 104.

The edge device 108 sends network packets. Network packets may be control packets, data packets or management packets. Control packets or control traffic is used to sense the quality of the path, link characteristics, clock synchronization etc. This is also known as the control plane. Data packets or data traffic are packets can be sent from the client and/or source computer to the application server running in the enterprise data center or private or public cloud 102. This is also known as the data plane. Management packets or management traffic are packets can be sent from the edge 108 or gateway 106 to the orchestrator 104 and includes heartbeat messages or flow statistics etc. This is also known as the management plane. In one example, both the control plane and the data plane can pass through the gateway 106. In some examples, only the control traffic may be sent to the gateway 106 and the data plane may bypass the gateway 106 and go directly from the edge 108 to the application server.

Figure 2:
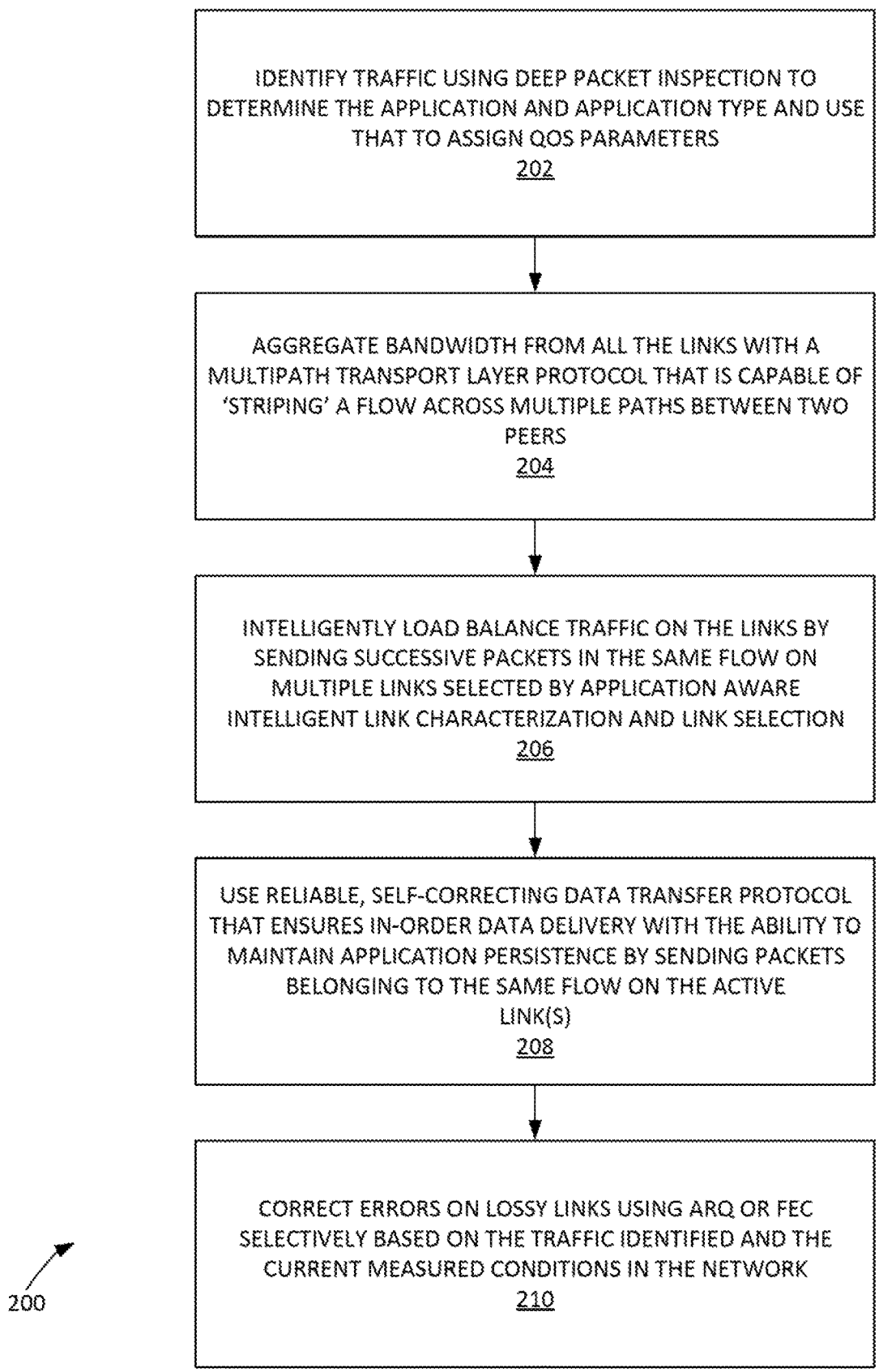
FIG. 2 depicts a process of a network link used to replace 'last mile' connectivity, according to some embodiments.

FIG. 2 depicts a process 200 of a network link used to replace a 'last mile' connectivity (e.g. last MPLS, T1 etc.), according to some embodiments. The network links can be multiple consumer grade broadband links, private links (MPLS, etc.), WiFi networks or 3g/4g mobile links with the ability to perform process 200. In step 202 of process 200, network traffic can be identified using deep-packet inspection to determine the application and/or application type of the traffic. Appropriate measures can be applied to ensure the QoS of the specific traffic based on the application, application type (e.g. real-time, transactional, bulk) and/or business priority of the traffic. For example, if the network traffic is identified as voice traffic which is a high business priority, then forward-error correction can be performed to reduce or eliminate packet loss. In another example, the network traffic can be identified as a bulk-file transfer. In this example, the file-transfer network traffic can be set as the lowest-priority traffic and can use a small portion of bandwidth under contention or more bandwidth if no other traffic is in the network. Traffic identified as 'regular web browsing' (such as Facebook® and YouTube®) can be dropped out of the network altogether and sent over the regular Internet as it is not business critical. In step 204, bandwidth can be aggregated from all the links (e.g. a link can be a communications channel that connects two or more communicating devices). For example, bandwidth can be aggregated with a multipath transport layer protocol capable of 'striping' a traffic flow (e.g. flow of data packets from a source to a destination) across multiple paths between two peers (e.g. edge 108 and/or gateway 106). Traffic flow can be 'striped' across the multiple paths in one peer and 'gathered' at the other peer. In step 206, traffic on the links can be intelligently load balanced by sending successive packets belonging to the same flow (e.g. a traffic flow) on multiple links selected by an application aware intelligent link characterization and/or link selection it is noted that the selected QoS based on the application can inform the selected links (e.g. whether to bind traffic to the best link, load balance or replicate traffic, etc.). The selected QoS can also determine whether the application is sensitive to loss and/or jitter. Based on the levels of loss and jitter in the network and the sensitivity of the traffic to them, a mitigation mechanism is put into play. In step 208, outages can be prevented using reliable, self-correcting data transfer to ensure in-order data delivery with the ability to maintain application persistence, as long as there is at least one active link, by sending packets belonging to the same flow on the active link(s). In step 210 errors on lossy links can be corrected using an error control mechanism for data transmission (e.g. Automatic Repeat-reQuest (ARQ) and/or forward error correction (FEC)) selectively based on the traffic identified and the current measured, conditions in the network.

Figure 3:
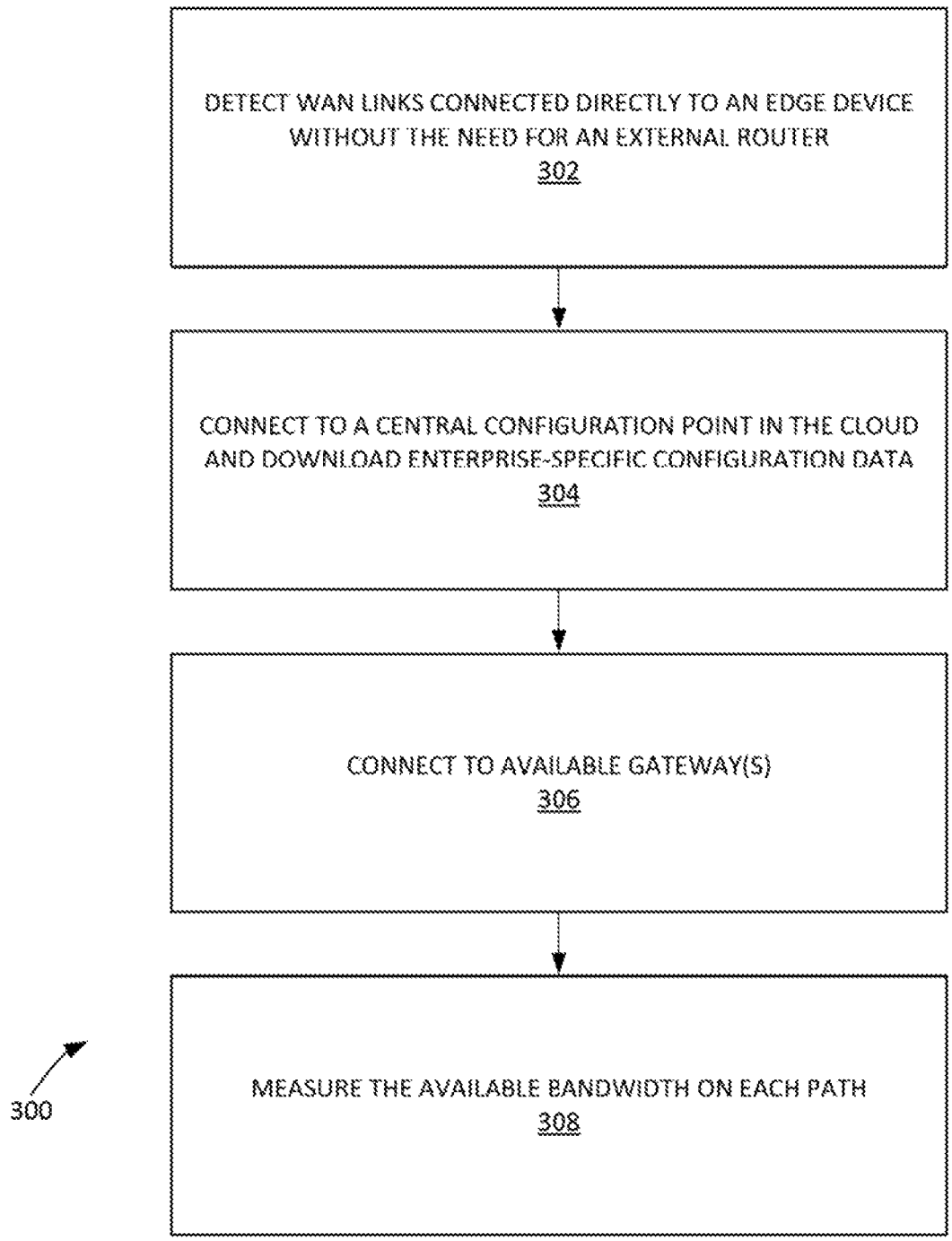
FIG. 3 depicts a process of removing the requirement for an IT administrator to configure each individual device in an enterprise computing network, according to some embodiments.

FIG. 3 depicts a process 300 of removing the requirement for an IT administrator to configure each individual device in an enterprise computing network, according to some embodiments. In step 302, WAN links that are connected directly to the edge device can be detected and measured without the need for an external router. In step 304, a central configuration point in the cloud can be connected to. Enterprise-specific configuration data, including available gateways, can be downloaded. In step 306, the available gateway(s) can be connected to by the entity in the cloud with the enterprise-specific configuration data. In step 308, an available bandwidth on each path can be measured.

A multipath (MP) protocol can implemented by combining multiple network paths into a composite connection that multiplexes packets from MP packet flows and control information (path quality, link characteristics, clock synchronization, etc.). An MP packet flow can map to a pair of internet protocol (IP) flows (e.g. one flow in each direction such as forward and reverse and between two endpoints). The MP packet flow can be identified by a set of parameters that describe a pair of IP flows (e.g. five (5)-tuple (the reverse path is described with source and destination swapped), namely: source IP address, destination IP address, source port, destination port, and the network layer three (3) protocol identifier. In some examples, a multipath routing can include a routing technique of using multiple alternative paths through a network.

In effect every network layer four (4) flow (e.g. a pair of layer three (3) flows) (e.g. an application flow) can have a one-to-one mapping with the MP packet flow. In some embodiments, an, application flow and MP packet flow refer to the same notion. Each MP packet flow can be assigned an MP packet-flow identifier. The MP packet-flow identifier can be unique to the set of MP peers (e.g. peer one (1) and/or peer two (2) of FIG. 4). An MP node can aggregate connections from multiple MP peers that are sending MP packet flows to it (e.g. gateway(s) 106). The MP node can aggregate flow identifiers generated b the non-aggregation peer (e.g. edge device 108) that may not be unique.

Figure 4:
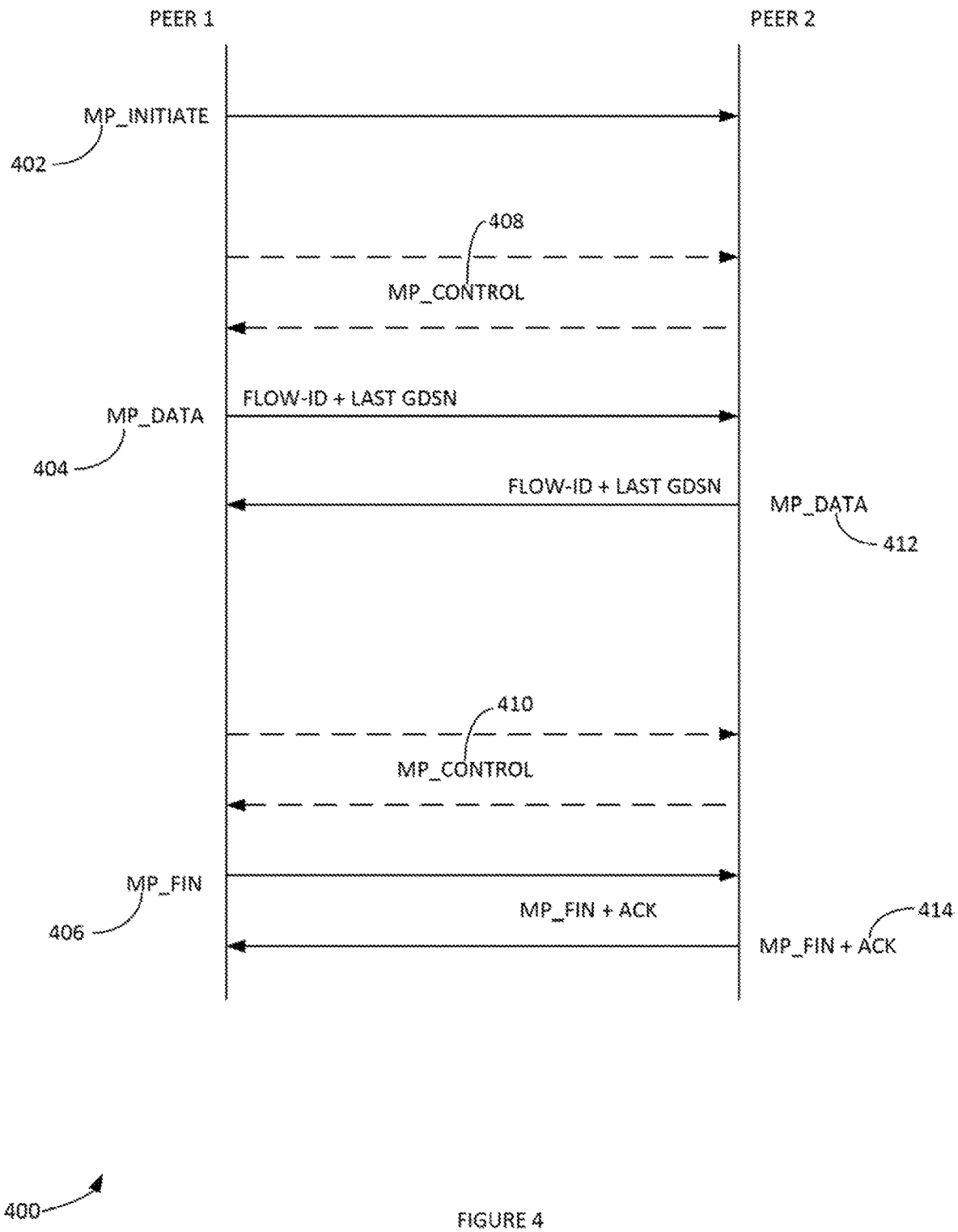
FIG. 4 illustrates an example flow sequence diagram for an MP packet flow, according to some embodiments.

In one example, at the time of first connection between two MP stacks, an MP_INITIATE message can be passed which assigns a unique identifier that is used by the non-aggregation peer to ensure the flow identifier is unique at the aggregation point (see FIG. 4). In one example, this operation can be implemented to an identifier specific to the particular network of the non-aggregation peer.

FIG. 4 illustrates an example flow sequence 400 diagram for an MP packet flow, according to some embodiments. In one embodiment, peer one (1) can be a client-side edge device and peer two (2) can be a cloud-based gateway device. Peer one (1) can transmit an MP_INITIATE 402 to peer two (2). MP_CONTROL 408 (e.g. control information such as QoS parameters, treatment of data traffic flow parameters, etc.) can be exchanged between peer one (1) and peer two (2). Data packets can then be exchanged (e.g. MP_DATA 404 and MP_DATA 412). Data packets can include any user data. These data packets can be sequenced, numbered and/or sent across multiple links. When sent across multiple links, redundant copies of the packets can be purged on receipt. Data packets can be acknowledged on return. Additional control data (e.g. MP_CONTROL) can be exchanged. MP_FIN 406 can initiate closing the MP packet flow session by peer one (1). Peer two (2) can provide MP_FIN+ACK 412 to acknowledge MP_FIN 406 can terminate session.

Figure 5:
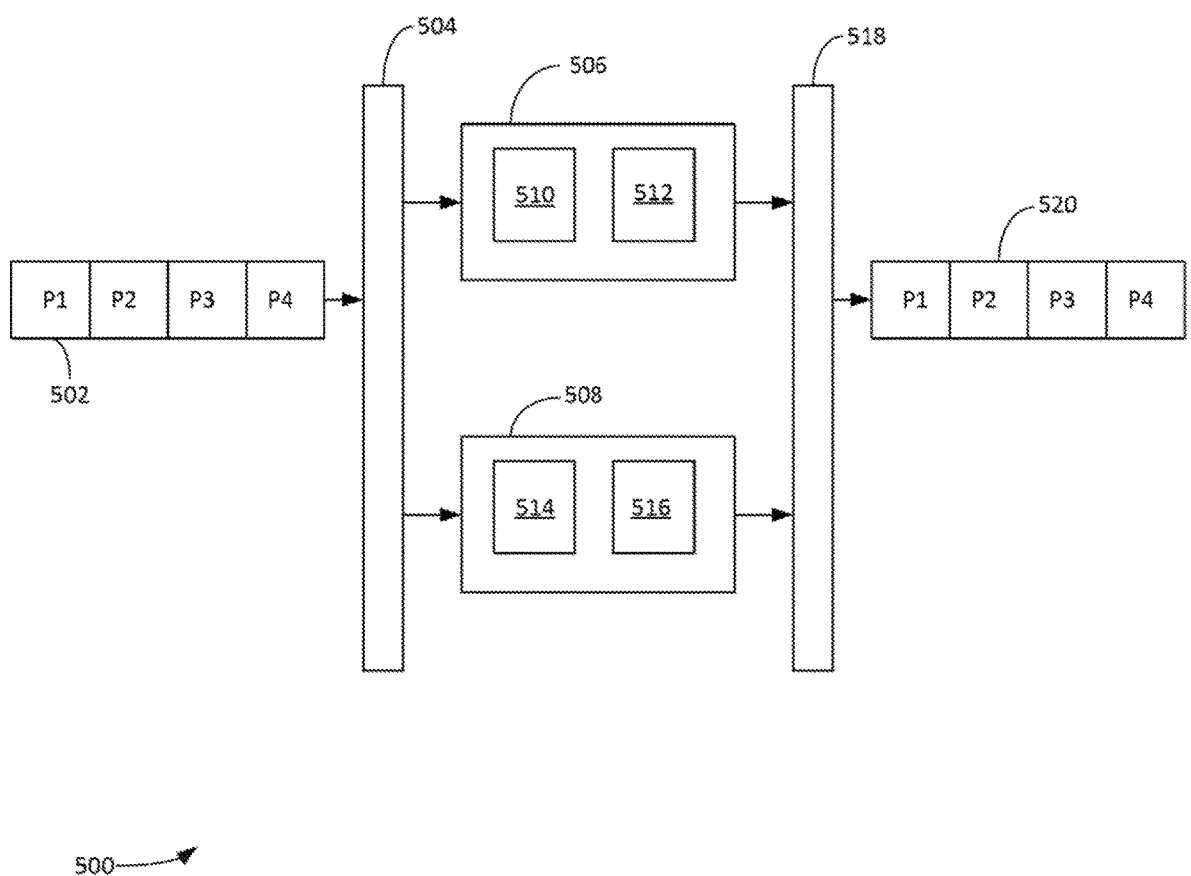
FIG. 5 illustrates an example MP process for bandwidth aggregation and data ordering, according to some embodiments.

FIG. 5 illustrates an example MP process 500 for bandwidth aggregation and data ordering, according to some embodiments. Process 500 can be used for intersession load balancing. In some embodiments, the MP stack can achieve bandwidth aggregation by sending successive packets belonging to the same MP packet flow on the different paths, to a peer MP stack. In some examples, different paths can be established on different links (though this is not a limiting condition). For example, data packets 502 can be an application flow. Data packets 502 can be striped with a MP stripe 504 in one device (e.g. edge device 108).

The endpoints (e.g. client and the application server) can infer this as an aggregated throughput as more packets are delivered to the endpoints in a given time window when compared to non-multipath case. MP process 500 can deliver ordered data 505 and 508 between two MP peers even if the data is sent on different paths between the peers.

For example, successive data packets belonging to the same flow can be sent on different links with additional metadata. The metadata can identify data packet absolute offsets in the original flow. This metadata can be used to re-arrange the data back in order when the underlying application requires in-order data. In some applications (e.g. real-time collaboration applications) this re-ordering may introduce latencies that may be unacceptable. In these instances, data packets can be delivered in the same order of arrival. The application can handle ordering of data packets. This application awareness can be in the transport layer. This presence can be implemented on both sides of the network and enable interpretation of metadata and reassemble the data. This functionality can be selectively turned on/off based on detecting an application's particular requirements on receiving the ordered data 506 and 508. Additional headers, shown below, marked with MP headers 510 and 514 (e.g. "Vn") can be added. MP headers 510 and 514 can describe the data ordering along with other metadata (e.g. such as MP packet flow identifier, timestamps).

Figure 6:
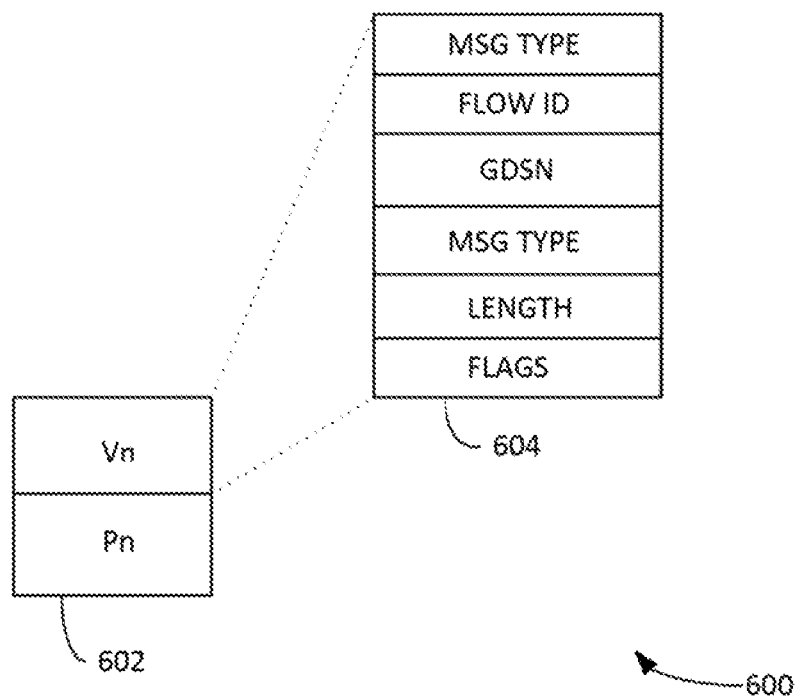
FIG. 6 illustrates an example of metadata in an MP header, according to some embodiments.

FIG. 6 illustrates an example of metadata in an MP header, according to some embodiments. This metadata can enable the peer MP stack to receive the MP packet flows 506 and 508 (including striped data packets 512 and 516) from different paths in their order of arrival and re-arrange them in order to re-create the original flow of data packets 502 as data packets 520.

In one example, a Global Data Sequence Number (GDSN) can be the byte offset of the data with respect to the original application flow (e.g. data packets 502). GDSN can be used to reorder the data. Each MP packet can have the GDSN which is used by the peer MP stack to re-order the MP packet flow in an original order. Additionally, each peer can transmit the last seen GDSN on its stack for a given MP packet flow 'piggybacked' on an MP data packet. This last seen GDSN can be used to purge queues and re-transmit a missing GDSN. In the case the data transfer is half-duplex, then a MP_ACK message can be explicitly used to transmit the last seen GDSN to the other peer.

In the context of FIG. 4, during the closing of the MP packet flow 400, the MP_FIN 406 can be set by the peer that initiates the closing of the MP packet flow 400. The GDSN in this packet can be used by the other peer to acknowledge teardown via the MP_FIN+ACK 414 with a GDSN of zero (0).

An example method of traffic identification is now provided. An MP system can utilize an external deep-packet inspection engine (and/or form of computer network packet filtering) to identify the application and application type of a given flow. This information can be used to determine the optimal MP packet flow settings to ensure the MP packet flow's QoS parameter. In cases where the application cannot be identified, an MP system can monitor the behavior of MP packet flows over time and attempt to derive the optimal settings for QoS. Future flows can be mapped to these new settings using IP address, port number, protocol, TOS/DSCP tag and/or destination hostname as the MP system learns optimal MP traffic parameters. Additionally, these settings which were obtained through this slow learning method (e.g. can include machine-learning methodologies such as neural networks, supervised learning, unsupervised learning, clustering, structured prediction, decision tree learning, reinforcement learning and the like) can be shared to all other edges in the network via the orchestrator 104 which can allow learning to be spread across an enterprise or the entire network of connected edges.

Deep-packet inspection (DPI) can include examining, the data part (and/or also the packet header, etc.) of a packet as it passes an inspection point, searching for protocol non-compliance, viruses, spam, intrusions, or defined criteria to decide whether the packet may pass or if it needs to be routed to a different destination, or, for the purpose of collecting statistical information. DPI can be performed with a DPI engine (e.g. Qosmos®, DPI engine, Dell™ SonicWALL™ Reassembly-Free Deep-Packet Inspection™ (RFDPI) engine, etc.) and/or other packet analyser.

An example of path characterization and selection is now provided. An MP protocol can implicitly implement communicating an MP packet flow on multiple paths (e.g. on a set of underlying links). Consequently, an active path characterization that periodically measures the health of a path can be implemented. A cost function that computes a cost for each path based on the parameters measured in the health check can be implemented. A selection algorithm can be implemented that applies a set of constraints and chooses the path based on the path cost and the transmit algorithm determined.

An example of active path characterization is now provided. As a part of link characterization, the latency (e.g. one-way packet delay), jitter (e.g. packet delay variation), loss and available bandwidth on the path can be measured. To measure latency between two MP peers on a given path, a clock synchronization operation can be implemented in the MP peers. An example time synchronization protocol is now provided. Timestamp measurements can be sent continuously to whichever device is performing the role of master clock. The lowest difference in timestamps from a set of measurements can be used as a measure of the offset between the clocks. Backward time shifts which could influence measurements and computation can be avoided. The drift rate can be measured by observing the change in offset over time. Based on this drift rate, the interval between continuous measurements can be calculated to ensure that clocks will remain synchronized over time. Once the docks are synchronized, the one-way receive latency and jitter can then be measured by sending a timestamped packet train.

In one example, multipath transport can handle and/or prevent congestion issues when the network paths are sufficiently diverse from a network topology standpoint. In these cases, the overall load on the individual paths can be reduced. On the other hand, diverse network paths can have diverse characteristics in terms of latency, throughput, loss and/or jitter. The load-balancing algorithm can send packets are on a 'best possible' link until the point the link is oversubscribed and/or there is loss on the link before switching to another path. When the network includes a wireline backbone (cable, DSL etc.), alternate paths can be utilized when available. On the other hand, with respect to networks with a wireless backbone (e.g. mobile, WiFi, WiMax, etc.), a packet drop may be an 'ephemeral' event that is short lived with relatively quicker recovery. In such a case, it may not be prudent to switch to alternate paths or clamp down the rate for this event without consideration of various other metrics. Thus, other metrics in addition to a loss value can be utilized. For example, a combination of parameters can be utilized, including, inter alia: the ECN flag (e.g. explicit congestion notification) set by an upstream router in an IP layer, a rate of acknowledgements received, a rate of loss in an interval of time to estimate the lossy value of a link, etc.

In one example, the cost of a MP path can be computed as the e taken for a data packet to reach from one peer to another peer inclusive of such factors as scheduling and/or MP processing overheads. It can be computed as the sum of the jitter, latency and processing delays. The path with the least cost with respect to, a given a set of constraints (e.g. link level policies, application specific path usage policies etc.) can be, selected accordingly.

An example MP path selection method is now provided. Based on the application and/or the current measured network conditions, the MP path(s) can be treated in various ways. In one example, the MP path can be load balanced such that each data packet selects the path with the lowest path cost and is transmitted on that path. In another example, the MP path can fixed such that the first packet selects the best path available. This path can be used as long it is available. If an active path characterization operation determines that the path is no longer available, a path selection operation can be performed again and the MP packet flow can migrate to a next best path. In yet another example, the MP path can be replicated across n-number paths based on such parameters as, inter alia: the importance of the application, bandwidth required and/or expected potential for packet loss in the network.

In one example, QoS can be ensured for an application by utilizing a combination of path selection methods such as those provided supra, as well as, network scheduling, packet reordering and/or error correction. For example, when an MP packet flow is initiated, an edge device (e.g. edge device 108) can identify the application and determine the proper QoS methods to be applied for this type of flow. The methods may or may not be symmetric (e.g. the same for the sender and receiver). Once the edge device determines the methods to be used, a control message can be sent to the gateway to ensure that the gateway (e.g. gateway(s) 106) in turn has information as to how to treat the MP packet flow (e.g. without having to do its own application identification). In the event the MP system (e.g. based on network conditions) and/or an administrator indicates that the methods should be changed, the edge device can again signal the gateway with a control message. The methods can be updated without interruption to the service or traffic. For example, upon receipt of the control message from the edge, the gateway can update the QoS methods of the flow without deleting the existing flow. As a result, the next packet to be sent can use the updated scheduling policies and link selection methods that were transmitted without interruption. For example, a MP packet flow that is being load balanced and is changed to replication as loss increases in the network can load balance packets 1-$n$ until the control message is received. Packet flow can be a sequence of packets from a source computer to a destination, which may be another host, a multicast group, or a broadcast domain. Accordingly, packets beginning with n+1 can begin to be replicated.

The gateway can be a multi-tenant gateway wherein multiple customers with edge devices can connect to the same gateway without actually exposing any of their data to each other. The multi-tenant gateway can implement a two-level hierarchical scheduler. In this case, a total egress bandwidth to the edge can be equally shared (e.g. in a work conserving manner) between all the connected edges at the top level (e.g. root level). The second level (e.g. a leaf) can schedule the MP packet flows belonging to a particular edge device rather than have resource limits defined for that edge device by the top level. To ensure that the scheduler does not hit processing limits for scheduling flows, the leaf level scheduler may not have per flow queues. Instead, a multiplexing algorithm can be utilized. The multiplexing algorithm can map a set of flows characterized by a set of parameters to a set of queues such that there is a many to one mapping between flows and queues.

In one example, SaaS applications may also directly interact with the software in the edge device (e.g. edge device 108 in FIG. 1) or gateway(s) (e.g. gateway 106 in FIG. 1). This can be done, for example, to query the health of the last-mile and to provision network bandwidth and characteristics in the last-mile to ensure QoS for the application. The edge device and/or the gateway(s) regardless of their embodiments provide APIs (application programming interfaces) that a SaaS application, with suitable permissions, can use to determine how the last-mile from the edge device to the gateway (e.g. in both directions) is performing. With this information the SaaS application may throttle back bandwidth so that the application continues to operate without congesting the network further and yet function reasonably well. By default, when an end-user accesses an application (which may run anywhere in the public cloud), the edge device identifies the application and determines the proper QoS methods to apply for this type of flow. As noted in supra, this includes network scheduling, packet reordering and/or error correction which is determined by policies set in the Orchestrator (e.g. orchestrator 104 in FIG. 1). The SaaS application may modify these policies dynamically to ensure that the end-user gets the best experience possible given the current last-mile characteristics.

Figure 7:
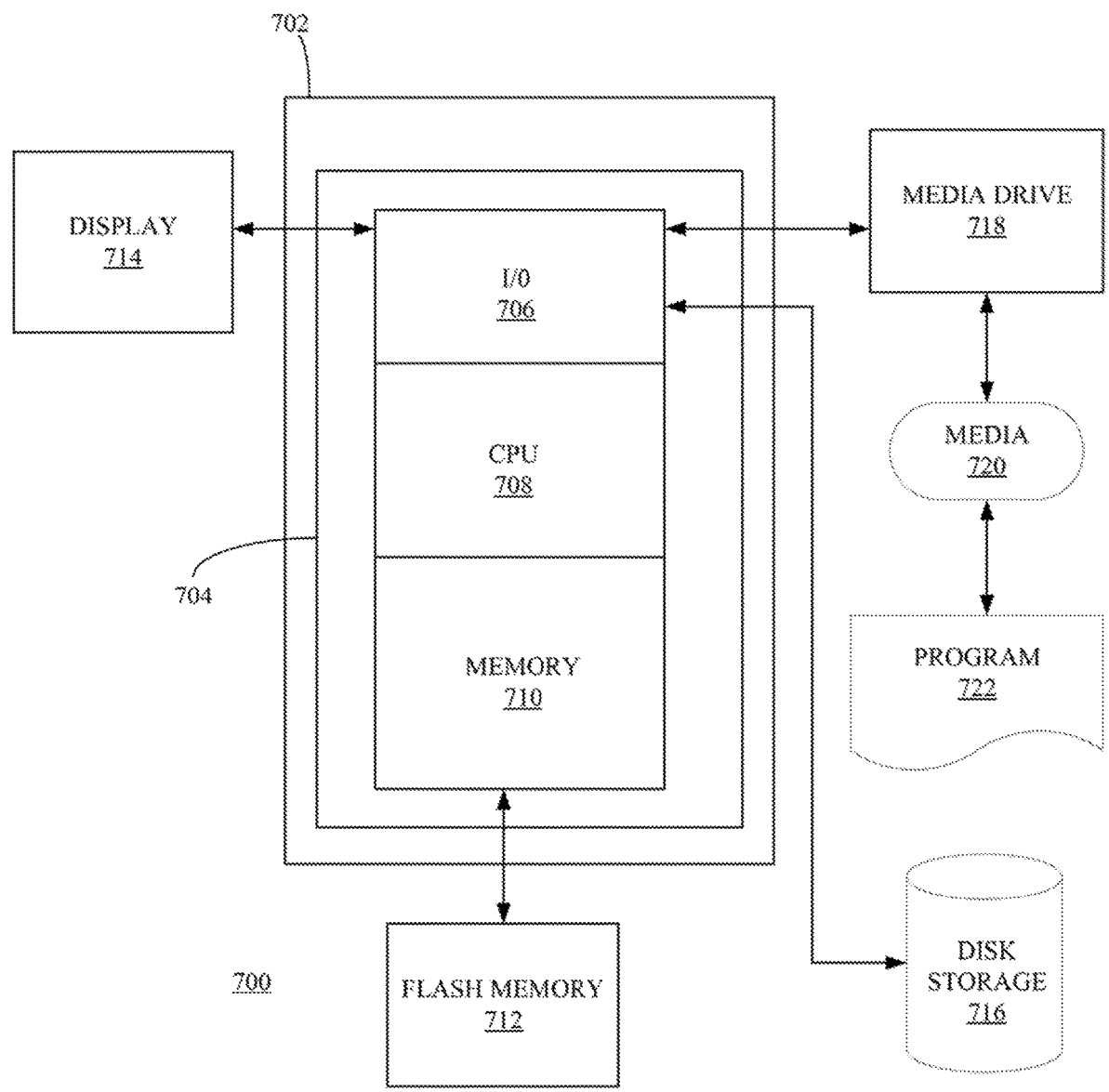
FIG. 7 depicts an exemplary computing system that can be configured to perform any one of the processes provided herein.

FIG. 7 depicts an exemplary computing system 700 that can be configured to perform any one of the processes provided herein. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a mother-board 704 having an I/O section 705, one or more central processing units (CPU) 708, and a memory section 710, which may have a flash memory card 712 related to it. The I/O section 705 can be connected to a display 714, a keyboard and/or other user input (not shown), a disk storage unit 716, and a media drive unit 718. The media drive unit 718 can read/write a computer-readable medium 720, which can include programs 722 and/or data.

B. CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method for directing packet flows in a software defined wide area network (SD-WAN), the method comprising:
at an edge device connected to a gateway via a plurality of network links between the edge device and the gateway, wherein the gateway is at a different location than the edge device:
receiving a packet flow;
performing deep packet inspection (DPI) on the received packet flow to identify an application type associated with the received packet flow; and
based on the identified application type, selecting a network link from the plurality of network links between the edge device and the gateway for forwarding the packet flow to the gateway.

2. The method of claim 1, wherein the gateway is in a public cloud.

3. The method of claim 1, wherein the gateway is in a datacenter.

4. The method of claim 1, wherein the edge device is at a premises of an enterprise, and the plurality of network links connect the premises to the gateway at the different location.

5. The method of claim 1, wherein selecting the network link comprises selecting, based on the identified application type, two or more network links from the plurality of network links to forward the packets of the flow to the gateway.

6. The method of claim 5, wherein selecting the two or more network links comprises:
assessing bandwidth on the plurality of network links; and
load balancing traffic on the two or more network links to distribute the packets belonging to the flow among the two or more network links.

7. The method of claim 6, wherein load balancing traffic comprises assessing a quality of a network link based on the identified application type.

8. The method of claim 7, wherein assessing the quality of the network link comprises measuring a quality of the network link based on at least one of latency, jitter, loss, and available bandwidth.

9. The method of claim 5, wherein selecting the two or more network links comprises identifying a set of two or more active network links.

10. The method of claim 1, wherein the identified application type comprises an identify of a specific application associated with the network-traffic flow.

11. The method of claim 1, wherein the identified application type comprises a bulk-file transfer application type, wherein bulk-file transfer network traffic is set as a lowest priority traffic and uses a small portion of network bandwidth.

12. The method of claim 1, wherein when the identified application type comprises a social-network website browsing application type, the network-traffic flow is switched to an internet connection.

13. The method of claim 1, wherein the identified application type comprises a voice application type, and wherein the voice application type comprises a high priority traffic type, the method further comprising performing a forward-error correction to reduce packet loss.

14. A non-transitory machine readable medium storing a program for execution by a set of processing units, the program for directing packet flows along a plurality of network links defined between an edge device and a gateway device of a software defined wide area network (SD-WAN), the program comprising sets of instructions for:

at an edge device connected to a gateway that is at a different location than the edge device:
        receiving a packet flow;
        performing deep packet inspection (DPI) on the received packet flow to identify an application type associated with the received packet flow; and
        based on the identified application type, selecting a network link from the plurality of network links for forwarding the packet flow to the gateway.

15. The non-transitory machine readable medium of claim 14, wherein the gateway is in one of a public cloud and a datacenter.

16. The non-transitory machine readable medium of claim 14, wherein the edge device is at a premises of an enterprise, and the plurality of network links connect the premises to the gateway at the different location.

17. The non-transitory machine readable medium of claim 14, wherein the set of instructions for selecting the network link comprises a set of instructions for selecting, based on the identified application type, two or more network links from the plurality of network links to forward the packets of the flow to the gateway.

18. The non-transitory machine readable medium of claim 17, wherein the set of instruction for selecting the two or more network links comprises sets of instructions for:
    assessing bandwidth on the plurality of network links; and
    load balancing traffic on the two or more network links to distribute the packets belonging to the flow among the two or more network links.

19. The non-transitory machine readable medium of claim 18, wherein the set of instructions for load balancing traffic comprises a set of instructions for assessing a quality of a network link based on the identified application type by measuring a quality of the network link based on at least one of latency, jitter, loss, and available bandwidth.

20. The non-transitory machine readable medium of claim 14, wherein the identified application type comprises an identity of a specific application associated with the network-traffic flow.

\* \* \* \* \*